United States Patent [19]
Eriksson et al.

[11] Patent Number: 5,901,053
[45] Date of Patent: May 4, 1999

[54] PLANT FOR TRANSMITTING ELECTRIC POWER TO REMOTE FACILITIES WHICH HAVE AN ELECTRIC MOTOR LOAD

[75] Inventors: Kjell Eriksson; Johan Lindberg, both of Ludvika, Sweden

[73] Assignee: Asea Brown Boveri AB, Vasteras, Sweden

[21] Appl. No.: 08/948,082

[22] Filed: Oct. 9, 1997

[30] Foreign Application Priority Data

Mar. 24, 1997 [SE] Sweden ................................. 9701067

[51] Int. Cl.⁶ ............................... H02J 3/36; H02M 5/45; H02M 1/12
[52] U.S. Cl. ................................ 363/35; 363/37; 363/41
[58] Field of Search ............................. 363/34, 35, 37, 363/40, 41

[56] References Cited

U.S. PATENT DOCUMENTS

| | | | |
|---|---|---|---|
| 4,563,732 | 1/1986 | Ljungqvist et al. | 363/35 |
| 4,651,266 | 3/1987 | Fujiioka et al. | 363/35 |
| 4,894,762 | 1/1990 | Steinshorn | 363/35 |
| 4,937,720 | 6/1990 | Kirchberg | 363/35 |
| 4,941,079 | 7/1990 | Ooi | 363/132 |
| 5,407,027 | 4/1995 | Suzuki et al. | 363/35 |
| 5,414,612 | 5/1995 | Bjorklund et al. | 363/35 |
| 5,751,563 | 5/1998 | Bjorklund | 363/35 |

FOREIGN PATENT DOCUMENTS

| | | |
|---|---|---|
| 464 843 | 6/1991 | Sweden . |
| WO 95/22848 | 8/1995 | WIPO . |
| WO 97/02639 | 1/1997 | WIPO . |

OTHER PUBLICATIONS

Lindberg, PWM and Control of Two and Three Level High Power Voltage Source Converters, 1995, Royal Institute of Technology, Sweden, pp. 1–3.

*Primary Examiner*—Peter S. Wong
*Assistant Examiner*—Bao Q. Vu
*Attorney, Agent, or Firm*—Pollock, Vande Sande &Amernick

[57] ABSTRACT

A plant for transmitting electric power comprises a direct voltage network for High Voltage Direct Current (HVDC) and at least one alternating voltage network connected thereto through a first station. The station transmits electric power between the direct voltage network and the alternating voltage network and comprises at least one VSC converter. The VSC converter converts direct voltage into alternating voltage and, conversely, alternating voltage to direct voltage. The alternating voltage network is a weak alternating voltage network, or a network without any generation of its own, and a large part of a load connected to the alternating voltage network consists of one or more electric motors.

7 Claims, 1 Drawing Sheet

PLANT FOR TRANSMITTING ELECTRIC POWER TO REMOTE FACILITIES WHICH HAVE AN ELECTRIC MOTOR LOAD

BACKGROUND OF THE INVENTION

The present invention relates to a plant for transmitting electric power comprising a direct voltage network for High Voltage Direct Current (HVDC) and at least one alternating voltage network connected thereto through a first station, the station being adapted to transmit electric power between the direct voltage network and the alternating voltage network. At least one VSC converter which converts direct voltage into alternating voltage, and conversely converts direct voltage into direct voltage network, is provided along with apparatus for controlling the converter.

Such a plant has recently been known through the thesis "PWM and control of two and three level high power voltage source converters" by Anders Lindberg, Kungliga Tekniska Högskolan, Stockholm, 1995, in which publication such a plant for transmitting electric power through a direct voltage network for High Voltage Direct Current (HVDC) is described. Before the issuance of the thesis, plants for transmitting electric power through a direct voltage network for High Voltage Direct Current have used line-commutated CSC (Current Source Converter) converters in stations for power transmission. IGBTs (Insulated Gate Bipolar Transistor=bipolar transistor having an insulated gate) for high voltage applications which may easily be turned on and turned off simultaneously, may be connected in series to form valves in VSC (Voltage Source Converter) converters for forced commutation. VSC converters are now an alternative for the transmission of electric power between a direct voltage network for High Voltage Direct Current and alternating voltage networks, and offer several important advantages with respect to the use of line-commutated CSCs in HVDC. Also, it is desired to find fields of use for this totally new type of plant, which is so far only theoretically described in the thesis mentioned above, which utilizes the particular advantages offered by such a plant with respect to other plants previously known for transmitting electric power.

BRIEF SUMMARY OF THE INVENTION

The object of the present invention is to provide a plant of the type defined in the introduction, which satisfies the objectives described above.

This object, according to the invention, is obtained by an alternating voltage network which is a weak alternating voltage network, and/or a network without any generation capability of its own, and where a large part of a load connected to the alternating voltage network comprises one or more electric motors.

In this type of plant it is possible to supply a weak alternating voltage network, or a network without any generation capability of its own (a dead alternating voltage network). This feature may advantageously be combined with the possibility, in such a plant, to control the flow of active and reactive power independently of each other, which means a totally new field of use for transmitting electric power in a direct voltage network for High Voltage Direct Current. It solves important problems of previously known constructions within this field of use.

When High Voltage Direct Current is used to supply an alternating voltage network having line-commutated CSCs, it has been necessary to provide the alternating voltage network with a generation capability of its own, which, for instance, in the case of feeding electric motors on an off-shore platform, means a requirement to have a local network on the platform. This requires a costly diesel engine or the like for driving this local network. By utilizing a plant according to the invention, it will be possible to manage without any such local network having a generation capability of its own, and such a diesel engine, gas turbine or the like is unnecessary. Furthermore, the possibility to regulate active and reactive power separately means that the plant can be driven like a SVC (Static Var Controller), which is an important advantage in power transmission, to an electric motor, since, when the motor is started, the reactive power flow thereto dominates strongly, but after that the active power demanded by the load dominates.

According to a preferred embodiment of the invention, the plant comprises at least one additional station connected to the direct voltage network with an additional alternating voltage network connected thereto. The additional alternating voltage network is an alternating voltage network generating electric power, and the direct voltage network extends over a distance which is long for an electric power transmitting application, without any alternating voltage network generating electric power connected to the remote first station. Such a plant is advantageous, since it avoids the need for a local network generating electric power for electric motors located at electrically distant places, where it, for various reasons, would be complicated and costly to arrange.

According to another preferred embodiment of the invention, the first station is arranged on an off-shore platform. The power transmission through the direct voltage network can take place from another platform or from land, and on such a platform there are electric motors consuming comparatively high power, which until now required local networks for driving them, which is very costly because of the distant and isolated localization of such a platform.

According to another preferred embodiment of the invention, the first station is arranged in connection with a mine. Mines are also often remotely located and isolated, the operating time is limited, and the entire equipment has to be moved from one place to another. These installations often utilize electric motors consuming comparatively high power, so that the advantages of a plant according to this embodiment are the same as in the previously described embodiment.

According to another preferred embodiment of the invention, the alternating voltage network connected to the first station is connected to at least an electric motor consuming comparatively high power, and the plant comprises members adapted to enable feeding of electric power from the direct voltage network to other loads in parallel with the motor. It is therefore possible to utilize the plant for driving electric equipment other than motors, so that, for example, in the case of off-shore platforms, the motors may be driven, and electric power may be provided on the platform as well.

According to another preferred embodiment of the invention, which constitutes a further development of the previous embodiment, the plant comprises means to disconnect the other loads fed in parallel from the energy supply from the direct voltage network when the motor is starting. Other parts of the plant, with another load, are thereby not disturbed during extreme conditions of a strong current surge which often occurs during the start of a large motor.

According to another preferred embodiment of the invention, the members comprise at least one second VSC converter connected to the direct voltage network and adapted to deliver electric power to loads other than the relatively high power consuming electric motor. Other loads may thereby be fed in parallel with the motor through the plant reducing the influence of motor starting.

According to another preferred embodiment of the invention, an synchronous motor is connected to the alternating voltage network connected of the first station. Such a motor requires a very high current during starting for a period of time in the order of 20–30 seconds as a consequence of the existing motor slips. The advantage of being able to separately regulate the transmission of active and reactive power to the alternating voltage network is particularly great when feeding such a motor.

Further advantages of the invention will appear from the following description and the claims.

BRIEF DESCRIPTION OF THE DRAWINGS

With reference to the appended drawings, below follows a description of preferred embodiments of the invention.

DETAILED DESCRIPTION OF THE INVENTION

Figure 1:
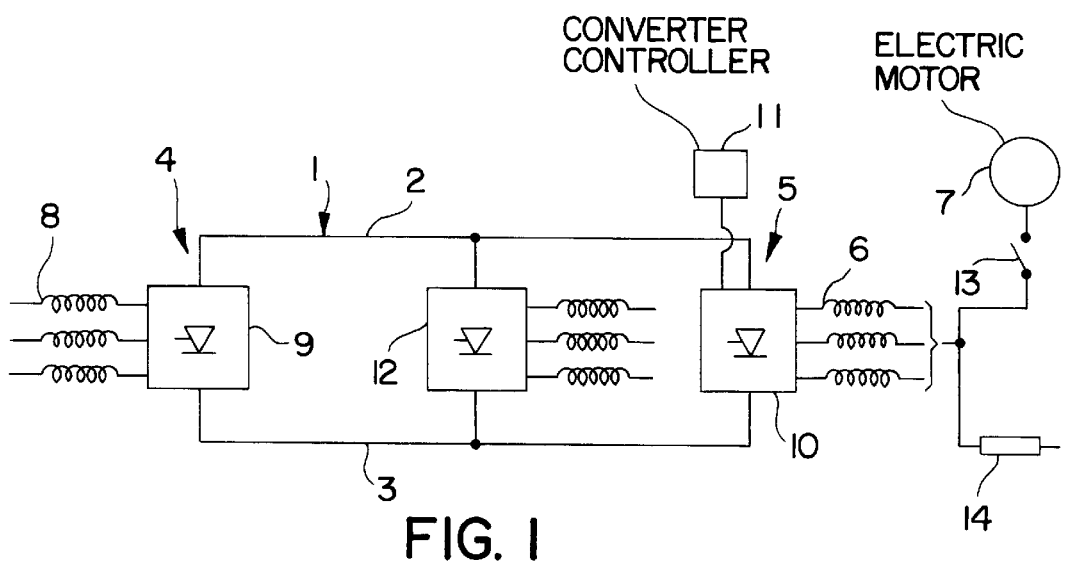
FIG. 1 is a schematic diagram illustrating the basic features of a plant according to a first preferred embodiment of the invention.

The construction of a plant for transmitting electric power according to the invention is schematically illustrated in FIG. 1, in which only the different components relating to the function of the invention have been shown for facilitating understanding of the invention.

The plant comprises a direct voltage network 1 for High Voltage Direct Current (HVDC=High Voltage Direct Current) having two pole conductors 2, 3 and stations 4, 5 arranged therealong for transmitting electric power between the direct voltage network, and an alternating voltage network connected to the respective station. An alternating voltage network 6 connected to the first station 5 is intended to be a so-called "dead" network without any generation capability of its own and is connected to an electric motor 7 such as an synchronous motor, or a plurality of such motors, having the ability to consume comparatively high power.

An alternating voltage network 8, which has generators for feeding electric power to the direct voltage network, is connected to the second station 4. The respective station comprises at least one VSC converter 9, 10 to convert direct voltage into alternating voltage and conversely alternating voltage to direct voltage. However, it is possible that the respective station comprises a plurality of such converters, but these are in the present description summarized through a single box. The VSC converter comprises, in a conventional way, so-called current valves, which comprise branches of breakers of the turn-on and turn-off type connected in series, preferably in the form of IGBTs, and diodes connected anti-parallel therewith. A great number of IGBTs may be connected in series in one single valve so as to be turned on and turned off simultaneously to function as one single breaker. As a result, the voltage across the valve is distributed among the different breakers connected in series. The control of the breakers is performed by pulse width modulation (PWM). The stations further comprise an apparatus 11, schematically indicated, for controlling the respective converter to provide such modulation (such an apparatus is only shown for the first station 5, but they are provided for all the stations of the plant).

It is intended that the distance between the stations 4 and 5 be comparatively long in connection with electric power transmission, so that the station 5 is located at an electrically remote place, such as for example an off-shore platform, at a mine, or on an island, where separate networks are required. The distance between the stations may be comparatively short in kilometers but nevertheless electrically long through the very localization.

Furthermore, the plant can have an additional VSC converter 12 connected to the direct voltage network to deliver electric power loads other than the motors in parallel with the feeding thereof. It is possible to connect converter 12 to the station 5. It is intended that the motor 7 may, through one breaker 13, be separated from the converter when it is not in operation and feeding of power may then take place to a load 14 connected in parallel with the motor. As a result of the characteristics of a VSC converter, active and reactive power supplied to the motor 7 may be separately controlled through the apparatus 11 by suitable control pulses to the converter. As a result, a powerful reactive power current may be generated during motor 7 starting, and following startup transmission of active power may dominate. Thus, the apparatus 11 may control the converter 10 in the first station 5 as an SVC by giving reactive power for this purpose thereto.

Figure 2:
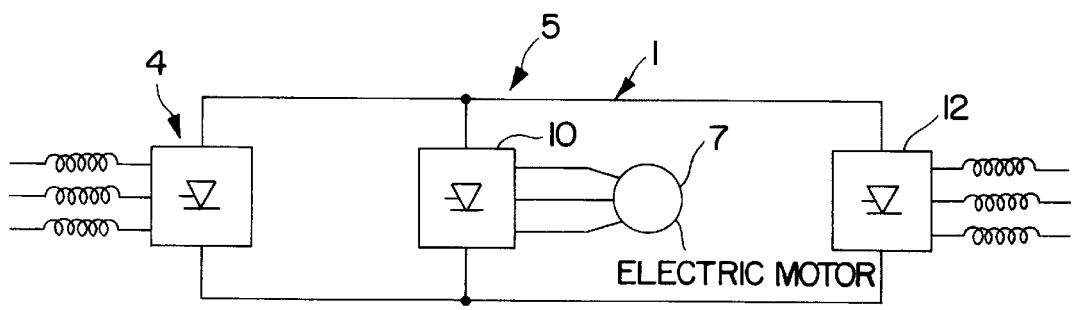
FIG. 2 is a view corresponding to FIG. 1 of a plant according to a second preferred embodiment of the invention.

The plant according to the embodiment illustrated in FIG. 2 differs from that of FIG. 1 only by the fact that the converter 10 of the first station 5 is connected to only the motor 7 for separate operation thereof without any other loads connected to the converter 10.

The invention is, of course, not in any way restricted to the preferred embodiment described above, but several possibilities to modifications thereof would be apparent to one skilled in the art without departing from the basic idea of the invention.

The number of stations, the number of loads connected in parallel, and the like, may for example be varied arbitrarily. An additional converter connected in parallel with the converter to which the motor is connected is shown in the figures, but the plant can be without such a converter connected in parallel or have more than one thereof.

The definition "alternating voltage network" is to be given a broad meaning, and includes a shorter connection line between a motor and converter for transmitting alternating voltage without being a "network" in the traditional meaning thereof.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A plant for transmitting electric power to a remote location comprising:
   a direct voltage network for High Voltage Direct Current (HVDC);
   a weak alternating voltage network;
   a power station having a VSC converter for connecting said weak alternating voltage network to said direct voltage network at a distance along said high voltage network remote from any other alternating voltage network, said VSC converter converting direct voltage from said direct voltage network to an alternating voltage, and converting alternating voltage from said weak alternating voltage network to direct voltage; and
   a load connected to said weak alternating voltage network a substantial portion of which is provided by one or more electric motors.

2. The plant according to claim 1 further comprising:
   a second alternating voltage network which generates power; and
   a second station connecting said alternating voltage network to said direct voltage network, said station including a VSC Converter for converting direct voltage to an alternating voltage, and for converting direct voltage to an alternating voltage.

3. The plant according to claim 1 wherein said station includes means to supply power from said direct voltage network to a parallel load.

4. The plant according to claim 3 further comprising means for disconnecting said parallel load from receiving power from said direct voltage network when said motor is starting.

5. The plant according to claim 3 wherein said means is a second VSC voltage converter to independently supply alternating voltage from said direct voltage network to said parallel load.

6. The plant according to claim 5 wherein said motor is an asynchronous motor connected to said alternating voltage network.

7. The plant according to claim 1 wherein said VSC voltage converter includes an apparatus for controlling reactive power orders said converter to act as an SVC.

* * * * *